(No Model.) 3 Sheets—Sheet 2.
S. CROFT.
CONFECTIONERY MACHINE.
No. 550,746. Patented Dec. 3, 1895.
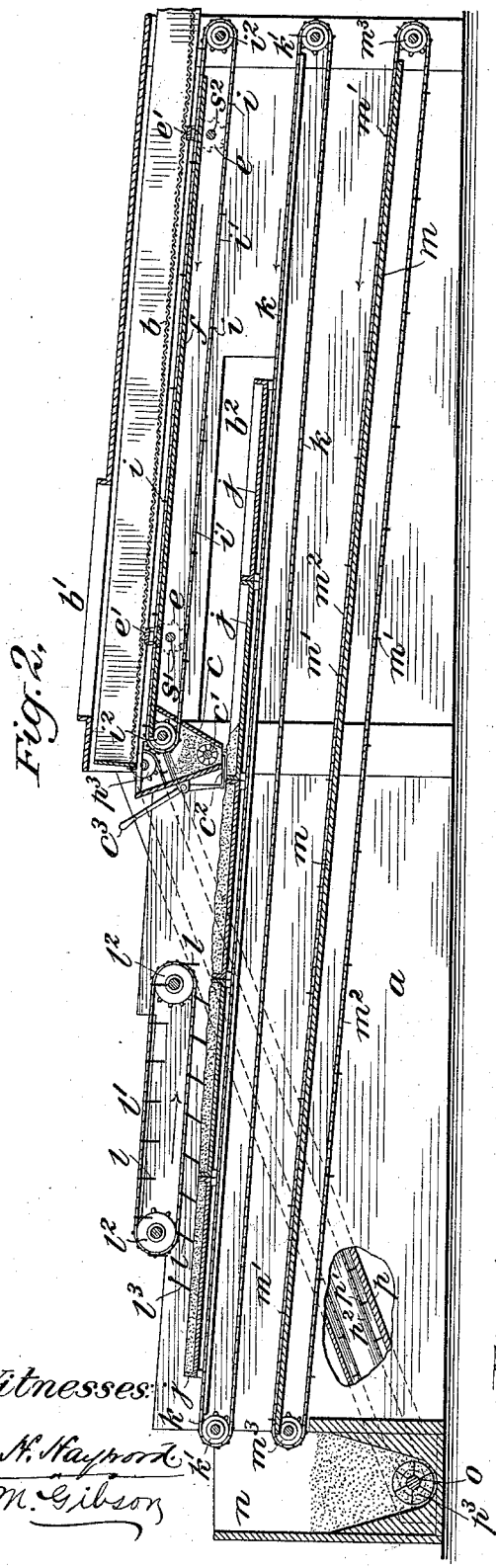
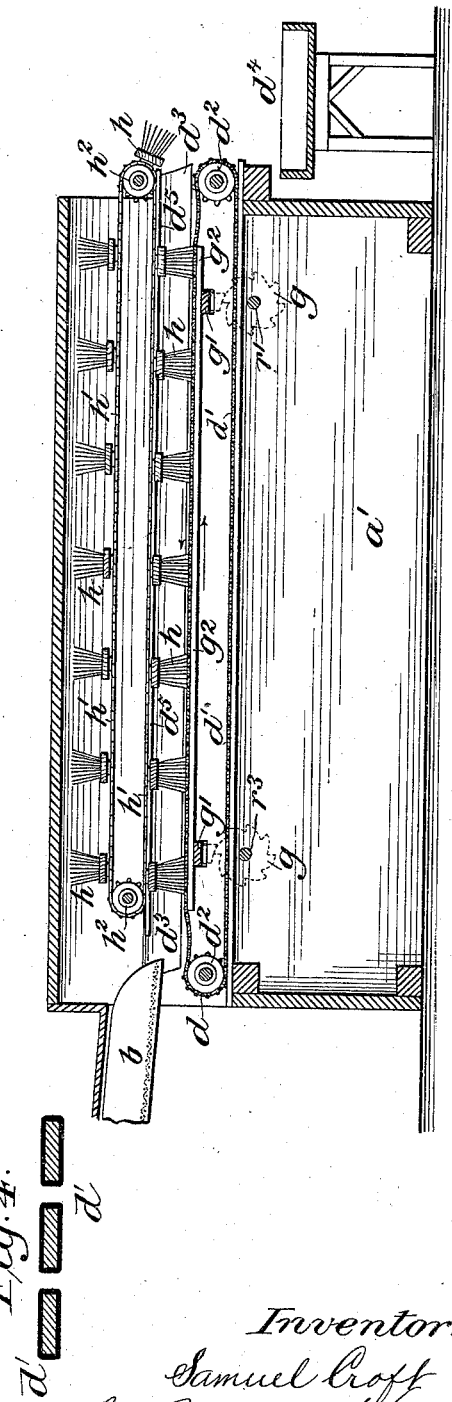
Witnesses:
D. N. Hayward
M. Gibson
Inventor:
Samuel Croft
By Redding & Kiddle
Attorneys

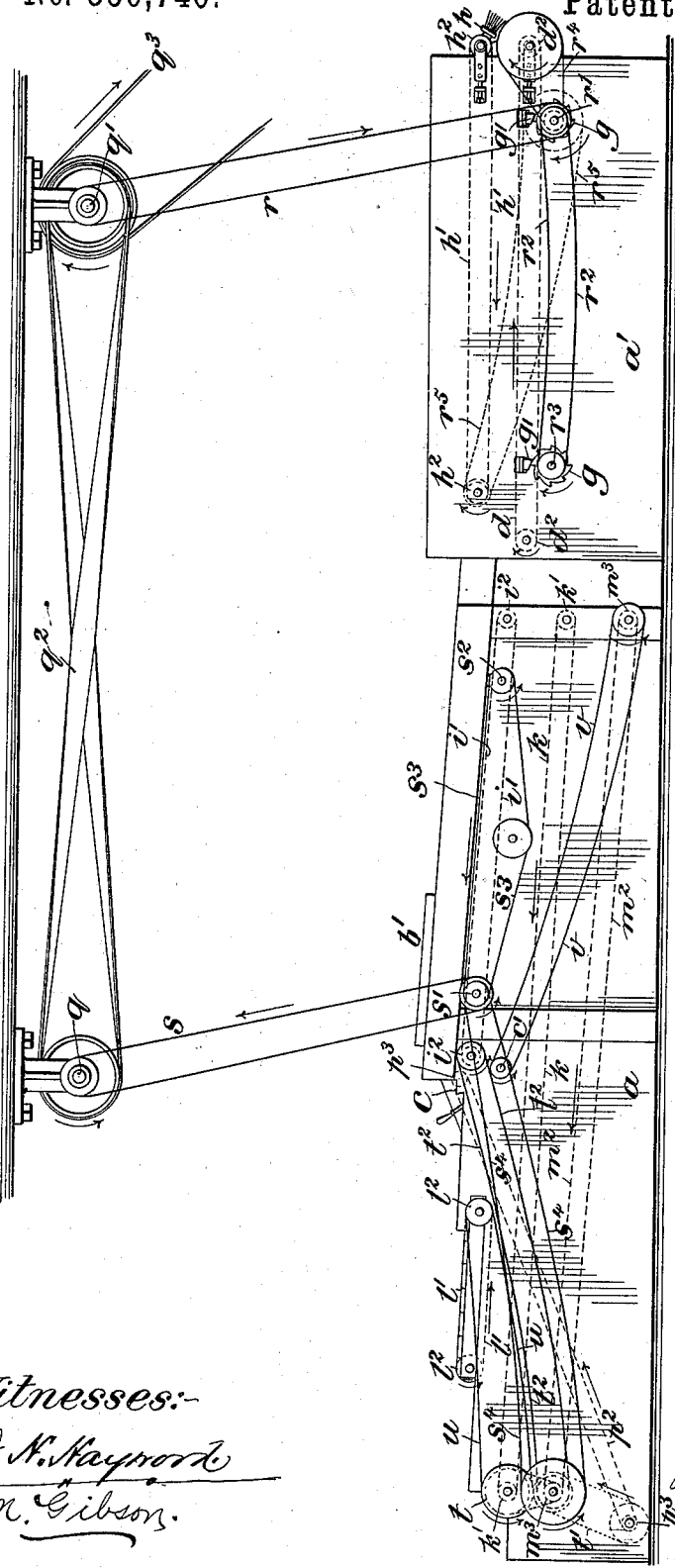

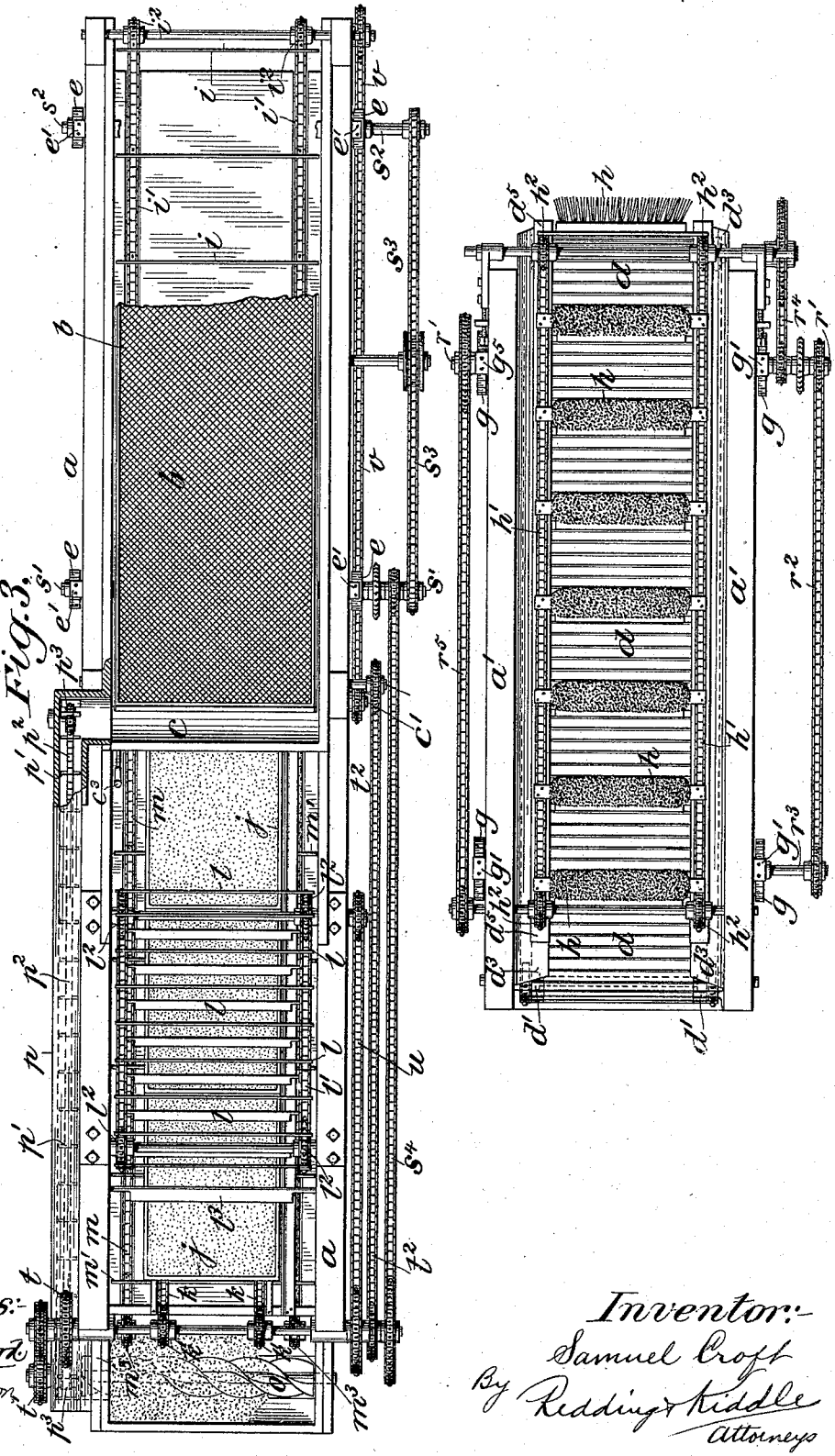

UNITED STATES PATENT OFFICE.

SAMUEL CROFT, OF MERION, PENNSYLVANIA.

CONFECTIONERY-MACHINE.

SPECIFICATION forming part of Letters Patent No. 550,746, dated December 3, 1895.

Application filed June 16, 1894. Serial No. 514,728. (No model.)

*To all whom it may concern:*

Be it known that I, SAMUEL CROFT, a citizen of the United States, and a resident of Merion, Lower Merion township, Montgomery county, State of Pennsylvania, have invented certain new and useful Improvements in Confectionery-Machines, of which the following is a specification, reference being had to the accompanying drawings, forming part hereof.

This invention relates to machines employed in the manufacture of confectionery and in other arts, and particularly to the handling, separation, and cleaning of molded articles, the separation of the molding material, and the filling and smoothing of the trays.

The machine embodying this invention has been used in connection with articles of confectionery cast or molded in molds or forms or prints formed in masses of starch as a molding material, as well understood in the art of making candy or confectionery. In this process of manufacture trays are employed, of proper depth and convenient size, and these trays are filled with the starch, and the desired molds are then impressed therein and the liquid or viscid confection is then poured into the molds. A suitable time is allowed for the confection to set to the desired form, and then the formed confections are separated from the starch, and the starch is again placed in the trays and the operation repeated. The same starch is used over and over again, and it is therefore highly advantageous to prevent waste of the starch in separating it from the confections and again placing it smoothly within the trays. It is also desirable to thoroughly clean the confections from adhering particles of starch.

The machine embodying this invention is adapted to separate the molded articles or confections from the starch, it being only necessary to dump or deposit the commingled articles and starch from the trays into the appropriate part of the machine, so that they fall upon a vibrating sieve, which sieve performs the function of separating the greater part of the starch from the molded articles and finally delivers the molded articles onto a traveling platform or carrier, and this platform or carrier is also vibrated and carries the molded articles along in contact with a brushing device, and this brushing, in conjunction with the agitation of the carrier, which causes all parts of the articles to be exposed to the brushing device, effectually removes the particles of starch from the articles and cleans them. The sieve which initially receives the commingled articles and starch is inclined and elongated, so that as the articles gradually fall down the incline they pass over a considerable screening-surface, and a platform or table is arranged below this sieve to receive the separated starch. A traveling scraper works over this table and carries the separated articles and starch into a receptacle or hopper, which I denominate the "feed-hopper," from which the starch or molding material is again supplied to the trays. The operator, after he has dumped the commingled articles and starch from a tray into the appropriate part of the machine, places the empty tray on a traveling traycarrier conveniently arranged in relation to the point at which the contents of the tray are dumped into the machine, and this traycarrier conveys the empty tray under the feed-hopper, and as the tray thus passes under the hopper the separated starch is supplied to the tray. Yielding smoothing-plates are suitably arranged in the machine, and the filled trays pass under these smoothing-plates, which distribute and smooth the surface of the starch within the trays and thus prepare the trays for receiving the impressions necessary for another molding operation. The trays when thus filled and smoothed are suitably removed from the machine by an operator. During the process of filling and smoothing the trays there is necessarily some overflow of the starch, and this overflow is received upon a table or platform arranged below the tray-carrier, and preferably also extending below the scraper of the sieve, and a second scraper works over this lower and overflow receiving-table and conveys the starch thereon to a suitable receiving-hopper. From this receiving-hopper the starch may be conveyed by hand to the feed-hopper; but I prefer to do this work automatically, and therefore provide a traveling scraper or conveyer which carries the starch from the receiving-hopper to the feed-hopper.

To explain my invention more particularly I will now refer to the accompanying drawings, in which—

Figure 1 is a general side elevation showing a confectionery-machine embodying my invention. Fig. 2 is an enlarged vertical longitudinal section of the same, the view being divided at a point to the right of its middle portion and the right-hand portion being shown just beneath the other portion of the machine. Fig. 3 is a plan view of the same drawn to the same scale as Fig. 2 and divided in a similar manner. Fig. 4 is an enlarged cross-section of a portion of the flexible traveling platform.

The machine is shown as provided with closed side frames and with covers for those parts of the machine wherein the starch particles are thrown about or agitated. For greater convenience in manufacture the framework is divided into two parts, the left-hand part $a$ containing, mainly, the screening-sieve, feed-hopper, tray-carrier, and smoothing device and the right-hand part $a'$ containing, mainly, the article-carrier and brushing device. The inclined vibrating sieve $b$ extends from a point over the feed-hopper $c$ toward the right and into the part $a'$ of the frame and terminates over the article-carrier $d$. The trays are dumped into the machine through the opening $b'$, and the commingled molded articles and starch fall upon the surface of the inclined sieve $b$, near the left-hand or upper end thereof. The sieve is rapidly reciprocated in a vertical direction by means of the rotating cam-wheels $e$ $e$, which are each provided with a series of projections or teeth arranged to successively engage with inclined projections from the transverse supporting-bars $e'$, and, as shown, four of these cam-wheels are employed, one near each corner of the sieve.

The transverse bars $e'$ are fitted so as to have a vertical movement in the side frames and have inclined projections, which rest upon the upper surfaces of the cam-wheels $e$, so that the sieve is supported upon these cam-wheels and is free to move vertically, and as the cam-wheels are rotated the sieve is caused to reciprocate rapidly in a vertical direction, and thus the material that has been poured upon the sieve is rapidly thrown up and falls down and the fine starch particles, which will readily pass through the meshes of the sieve, are separated from the molded articles which will not past through said meshes and the starch particles settle upon the table or platform $f$, which is arranged below the sieve $b$. The agitation or vibration of this sieve $b$ in a vertical plane produces a very rapid and effective separation of the starch and molded articles, while it does not cause any undue rubbing of the articles over the surface of the sieve, as the articles when they fall upon the sieve are thrown directly upward, and when they again fall are again thrown directly upward, and as by reason of the inclination of the sieve the articles slowly move toward the right. This operation is repeated again and again, and thus a very effectual separation is had without injury to the articles and without perceptible abrasion of their surfaces.

From the extreme right-hand end of the sieve $b$ the articles fall upon the article-carrier $d$, located in the part $a'$ of the frame. This article-carrier $d$ is shown as consisting of an endless belt made up of transverse slats $d'$, these slats being held at each end in a sprocket-chain running over rotating sprocket-wheels $d^2$ $d^2$, and these slats $d'$ are preferably covered with a yielding material, such as rubber tubing, and spaced apart so as to allow small slits or openings between them, through which any particles of starch may fall, as particularly shown in Fig. 4. This carrier is caused to reciprocate rapidly in a vertical direction by cam-wheels $g$ $g$, each provided with a series of teeth or projections and working against inclined projections from transverse bars $g'$ $g'$. Longitudinal bars $g^2$ extend under the carrier $d$ at each side thereof, terminating at each end a short distance from the sprocket-wheels $d^2$, and thus support at each end the slats $d'$ that are over the said longitudinal pieces $g^2$, and these longitudinal pieces are secured to or supported by the transverse bars $g'$ The transverse bars $g'$ are free to move vertically in the side frames, and as they are moved up and down by the cam-wheels $g$ impart a vertical reciprocatory motion to the portion of the carrier $d$ supported on the longitudinal bars $g^2$, said portion comprising almost the entire upper part of said carrier, and as a result of this construction this part of the carrier is rapidly agitated in a vertical plane and the articles deposited upon it and carried by it receive a corresponding motion.

It will be observed that the means for agitating the article-carrier $d$ are of substantially the same construction, so far as the shape and arrangement of the cams and cam-operated surfaces are concerned, as that of the means for agitating the sieve $b$. Guards or aprons $d^3$ are preferably arranged at each side of the frame to prevent the articles from escaping on either side of the carrier $d$, said aprons having flexible edges, which remain always in contact with the upper surface of the carrier during the movements of the carrier.

The brushing device is shown as consisting of a series of brushes $h$ $h$, and each of these brushes or a bar carrying the same is held at each end on a sprocket-chain $h'$, and these sprocket-chains run over the sprocket-wheels $h^2$, and these sprocket-wheels are caused to rotate in the same direction as the sprocket-wheels $d^2 d^2$, so that the brushes $h$ on the lower part of the sprocket-chains $h'$ move in the opposite direction to the upper surface of the article-carrier $d$, and thus brush backward over the articles conveyed upon the article-carrier. The ends of the brushes or the chains are preferably drawn over suitable guides $d^5$. The agitation of the article-carrier causes the articles to be thrown upward, and thus prevents their lodging in any fixed position upon said carrier, and the brushes pass over these articles as they are conveyed by the carrier, and thus the articles are presented in all positions to the brushes and are shaken about and brushed on all their surfaces, so that they are effectually cleaned when they reach the right-hand end of said carrier, at which point they drop off from said carrier and may be received in a suitable receptacle, as the box or tray $d^4$, (shown in Fig. 2,) at the extreme right-hand end of the machine.

The separated particles of starch that are deposited within the part $a'$ of the tray fall to the bottom of said tray and may be removed by taking off one of the side frames, or a portion or the whole of one of said side frames may be hinged to the frame, or a suitable door or removable piece may be provided for such purpose. The quantity of starch which reaches the part $a'$ of the frame is very small and need be removed only at very long intervals, and it has therefore not been deemed necessary in the construction of machine herein shown to provide automatic means for conveying such starch to the feed-hopper.

The table or platform $f$, arranged in the part $a$ of the frame and just below the sieve $b$, receives upon its surface, as above described, the particles of starch that are screened through the sieve $b$. To convey these starch particles to the feed-hopper $c$, I provide a traveling scraper, consisting of a series of transverse bars $i$, spaced at suitable distances apart, and each bar held at each end in the sprocket-chains $i'$, one sprocket-chain on each side of the machine, and these sprocket-chains $i'$ pass over sprocket-wheels $i^2$, which are caused to rotate so as to traverse the said bars $i$ over the upper surface of the table $f$ and toward the feed-hopper $c$, and thus the starch particles that fall upon the table $f$ are conveyed to the feed-hopper $c$.

The feed-hopper $c$ is shown as provided with a rotating stirrer $c'$ and with an adjustable gate $c^2$, controlled by the handle $c^3$. By these or equivalent devices the hopper is caused to continuously supply a regulated quantity of starch to the mold-trays $j$, which are conveyed by a traveling tray-carrier under said hopper. An opening $b^2$ is shown as provided in the side frame $a$, just beneath the opening $b'$ in the cover, through which latter opening the contents of the trays are dumped upon the sieve $b$, so that the operator, after he has emptied a tray, can readily insert said empty tray through the opening $b^2$ and place it upon the tray-carrier. The tray-carrier is shown as consisting of two sprocket-chains $k$ $k$, running over rotating sprocket-wheels $k'$ $k'$, and the trays simply rest by their own weight upon said sprocket-chains. The operator, in placing the trays $j$ upon the carrier, pushes each tray up against and in contact with the next preceding tray, so that the trays present a continuous series of receptacles for the starch which is fed thereto from the hopper, as will be seen in Fig. 2.

To smooth the upper surface of the starch within the trays $j$ and properly prepare said surfaces for the molding operation, I provide a series of yielding plates $l$ $l$, which are shown as suspended from the traveling sprocket-chains $l'$, running over the rotating sprocket-wheels $l^2$, and carrying said smoothing-plates $l$ in contact with the material in said trays in the opposite direction to that of the movement of the trays. These plates are made sufficiently heavy to exert the required pressure and act one after another to smooth down all irregularities on the surface of the starch within the tray, as well as to pack the starch particles quite tightly within the trays and thus effectively prepare the starch-filled trays for the molding operation. It sometimes happens that particles of starch are dropped from these plates $l$ at a point just beyond where the first plate meets the surface of the starch-filled trays, and it is therefore advisable to provide one or more suspended plates $l^3$, pivoted on the side frames and pivotally held at a fixed point to insure the smoothing down of any particles thus dropped upon the surface of the starch-filled trays and to finally complete the operation of smoothing and preparing the surface of the starch within the trays. As the trays pass out from under the action of the last plate $l^3$ they are removed from the machine by an operator and are ready for the molding operations, in which, as above set forth, impressions or molds are formed upon the starch held within them. These molds are filled with the fluid confections. The confections are allowed to set and harden, and then the commingled molded candies and starch are poured or dumped into the machine and upon the sieve $b$ and the empty tray is placed in the machine, to be again filled and prepared for the molding operation.

To insure an even distribution of the starch in the trays, it is advisable to supply to the trays from the feed-hopper $c$ a larger quantity of starch than is necessary to fill them, and then in the succeeding operation of smoothing down the surfaces of the starch in the trays the surplus starch will be brushed off. This surplus starch falls upon an inclined table or platform $m$, arranged beneath the frame-carrier and preferably extending from one end of the part $a$ of the frame to the other, so that it will receive upon its surface all the starch that is dropped by any part of the apparatus within the frame $a$. It is also to be noted that this table $m$ may, if desired, be caused to extend into the part $a'$ and thus from one end of the entire machine to the other, so as to receive upon its surface, also, the starch particles dropped from the article-carrier and brushing device. At the extreme left-hand end of the machine and just beyond the end of the table $m$ is arranged a receiving-hopper $n$, and the starch particles that fall upon the table $m$ are conveyed to this receiving-hopper $n$ by a traveling scraper which is shown as of the same construction as the scrapers $i$ $i'$ $i^2$, and which consists of a series of transverse bars $m'$ spaced at suitable distances apart and each bar held in the sprocket-chains $m^2$, one chain on each side of the frame and said chains running over rotating sprocket-wheels $m^3$, and as the sprocket-chains are caused to traverse by the sprocket-wheel $m^3$ the transverse bars $m'$ successively pass over the entire upper surface of the table $m$ toward the receiving-hopper $n$, and thus convey to the receiving-hopper $n$ the particles of starch that fall upon the table $m$.

In some constructions embodying this invention the starch that is accumulated within the receiving-hopper $n$ may be conveyed by the operators to the feeding-hopper $c$; but I prefer to provide automatic means for this purpose, and to that end a rotating worm $o$ is shown as arranged close to the curved bottom of the receiving-hopper $n$, and this worm $o$ acts to convey the starch in said hopper toward the rear end thereof, and a chute $p$ is provided, extending from the rear end of the receiving-hopper $n$ up to a point at the rear of the feed-hopper $c$ near the upper part thereof, and a rotating scraper, consisting of a series of transverse bars $p'$, held by a sprocket-chain $p^2$ running over sprocket-wheels $p^3$ $p^3$, is arranged within said chute, so that the bars $p'$ move over the upper face of the bottom of said chute, and thus convey the starch from the receiving-hopper $n$ upward through said chute and to a point where the starch will drop into the feed-hopper $c$. In some constructions this chute has been located between the side frames and on the opposite side of the machine from that shown; but it is of course evident that the construction and operation of this device are not altered by such arrangement other than by reversing the direction of feed of the worm $o$.

The arrangement of driving-gear is particularly shown in Fig. 1. The preferred mechanism for conveying motion to the different parts of the machine is sprocket-chains and gears, although it is evident that intermeshing toothed wheels or flat belts may be employed. As shown in Fig. 1, counter-shafts $q$ and $q'$ are arranged above the machine and connected together by a crossed belt $q^2$, so as to rotate in opposite directions, and motion is conveyed to these counter-shafts by a belt $q^3$. From the counter-shaft $q'$ motion is conveyed to the part $a'$ of the machine by the sprocket-chain $r$ running to the shaft $r'$, which shaft $r'$ is the main shaft of the part $a'$ of the machine and the shaft on which are mounted the right-hand agitating-cams $g$, which impart vertical reciprocatory motion to the carrier $d$. A chain $r^2$ conveys motion from the main shaft $r'$ to the shaft $r^3$ of the left-hand agitating-cams $g$, and said shafts $r'$ and $r^3$ are caused to rotate at the same speed, and the cams $g$ are so adjusted as to give a parallel motion to the frame $g'$ $g^2$, which supports the article-carrier $d$. A chain $r^4$ conveys motion from the shaft $r'$ to the shaft of the right-hand sprocket-wheel $d^2$ of the article-carrier $d$. Another chain $r^5$ conveys motion from the shaft $r'$ to the shaft of the left-hand sprocket-wheel $h^2$ of the brushing device. From the other counter-shaft $q$ motion is conveyed by the sprocket-chain $s$ to the shaft $s'$ of the part $a$ of the machine, and this shaft $s'$ is the shaft of the left-hand agitating-cam $e$ of the screening-sieve $b$. From the shaft $s'$ a chain $s^3$ conveys motion to the shaft $s^2$ of the right-hand agitating-cams $e$, said shafts $s'$ and $s^2$ being caused to revolve at the same speed and the cams being adjusted so as to give a parallel motion to the sieve $b$. From the shaft $s'$ another chain $s^4$ conveys motion to the shaft of the left-hand sprocket-wheel $m^3$ of the scraper $m$ for the surplus starch, and from this latter shaft a short chain $t$ conveys motion to the shafts of the left-hand sprocket-wheel $k'$ of the tray-carrier, and another chain $t'$ conveys motion to the shaft of the left-hand and lower sprocket $t^3$ of the chute $p$, and another chain $t^2$ conveys motion to the shaft of the left-hand sprocket-wheel $i^3$ of the upper scraper $i$ $i'$. The right-hand sprocket-wheel $l^2$ of the smoothing device is driven by a chain $u$ from the shaft of the left-hand tray-carrier sprocket $k'$. The stirrer $c'$ within the feed-hopper is driven by a chain $v$ running from the shaft of the right-hand surplus scraper sprocket-wheel $m^3$.

In the working of the various parts of the machine, and especially where sprocket-chains are drawn over supports, I have obtained excellent results by providing metal runners or channel-plates which come in direct contact with and support the sprocket-chains, and I prefer to construct the transverse or scraping plates so that they are just out of contact with the surfaces over which they are drawn, being supported by the metal guides for their sprocket-chains. I have also found that the starch forms an excellent lubricant for the various working parts of the machine, so that it is of advantage to have it in contact with the various traveling chains in the interior of the machine.

The machine above described embodying this invention has given highly satisfactory results in practice. In using this machine there is practically no waste of starch, and the machine is capable of doing its work rapidly, and no part of the machine is liable to get out of order, and the work of filling the molding-trays with starch and the work of cleaning the molded articles are effectually performed, so that the trays are ready for the molding operation when they leave the machine, and the candies or confections are ready for packing and selling when they leave the machine.

It is of course evident that parts of the machine embodying my invention may be used separately and in connection with other parts of different constructions than those herein shown and described, and it is also evident that various modifications may be made in the construction and arrangement of the several parts of the machine without departing from my invention.

What I claim, and desire to secure by Letters Patent, is—

1. The combination with an inclined vibrating sieve adapted to receive commingled molded articles and molding material, of a vibrating article-carrier adapted to receive the molded articles from said sieve, and a brushing device adapted to move in contact with the molded articles on said carrier, substantially as set forth.

2. A device for brushing and cleaning small articles, comprising a flexible endless belt adapted to carry said articles and having openings therein, means for rapidly vibrating the said endless belt, a brushing device adapted to move in contact with the articles on said belt, and means to deliver commingled articles and finely divided material to said belt, substantially as set forth.

3. A flexible carrier comprising a series of transverse slats on an endless chain or belt running over wheels, a frame supporting a portion thereof, and means for rapidly reciprocating in a substantially vertical direction said frame and the portion of the carrier supported thereby, in combination with a brushing device, working over said carrier, substantially as set forth.

4. A carrier comprising a series of transverse slats on an endless chain or belt running over wheels, a frame supporting a portion thereof, and means for rapidly reciprocating in a substantially vertical direction said frame and the portion of the carrier supported thereby, in combination with a brushing device comprising a series of brushes carried by an endless belt or chain running over wheels, whereby said carrier conveys and agitates molded articles, and the brushing device acts to remove the molding material from said articles, substantially as set forth.

5. The combination with a tray-carrier and means for supplying molding material to the trays thereon, of means for smoothing the molding material in said trays as they are conveyed by said carrier, a receiving table below said carrier, a receiving-hopper, a traveling scraper working over said table and adapted to carry molding material that falls upon said table into said receiving hopper, a rotating worm in said receiving-hopper, a chute extending from said receiving-hopper to the feed-hopper, and a traveling scraper for conveying up into the feed-hopper the molding material conveyed into the chute by the rotating worm of the receiving-hopper, substantially as set forth.

6. The combination with a tray-carrier and a feed-hopper arranged to supply molding material to the trays thereon, of a vibrating sieve and a receiving table below the same, said receiving table terminating at one end over said hopper, a scraper working over said table and adapted to carry the molding material to said end of said table so that the molding material will fall into the feed-hopper, a series of yielding smoothing plates arranged to bear upon the molding material in the trays as they are conveyed by said carrier, a receiving table below said carrier, said table terminating at one end over a suitable receptacle, and a traveling scraper working over said lower receiving table and adapted to carry molding material that falls upon said table to the said end thereof so that the molding material will fall into said receptacle, substantially as set forth.

7. The combination with a tray-carrier and a feed-hopper arranged to supply molding material to the trays thereon, of a vibrating sieve and a receiving table below the same, and a scraper working over said table and adapted to carry the molding material from said table into said feed-hopper, and means for smoothing the molding material in said trays as they are conveyed by said carrier, a receiving table below said carrier and feed-hopper, a receiving hopper, a traveling scraper working over said lower receiving table and adapted to carry molding material that falls upon said table into said receiving-hopper, a rotating worm in said receiving-hopper, a chute extending from said receiving-hopper to the feed-hopper, and a traveling scraper for conveying up into the feed-hopper molding material conveyed into the chute by the rotating worm of the receiving-hopper, substantially as set forth.

8. The combination with an inclined sieve and means for rapidly reciprocating the same in a substantially vertical direction, of an article-carrier comprising a flexible traveling platform and means for rapidly reciprocating the same in a substantially vertical direction, and a brushing device working over said carrier, substantially as set forth.

9. The combination with an inclined vibrating sieve adapted to receive commingled molded articles and molding material, of a vibrating article-carrier adapted to receive the molded articles from said sieve, and a brushing device adapted to move in contact with the articles on said carrier, and a feed-hopper for the molding material and means for conveying to the feed-hopper the molding material screened through said sieve, a tray-carrier adapted to carry trays under the feed-hopper and means for supplying a regulated quantity of molding material from said feed-hopper to the said trays, substantially as set forth.

This specification signed and witnessed this 14th day of June, A. D. 1894.

SAMUEL CROFT.

In presence of—
  HENRY D. WILLIAMS,
  E. M. TAYLOR.